United States Patent [19]

Reich

[11] Patent Number: 4,550,593
[45] Date of Patent: Nov. 5, 1985

[54] TURBOMOLECULAR PUMP SUITABLE FOR PERFORMING COUNTERFLOW LEAKAGE TESTS

[75] Inventor: Günter Reich, Cologne, Fed. Rep. of Germany

[73] Assignee: Leybold-Heraeus GmbH, Cologne, Fed. Rep. of Germany

[21] Appl. No.: 399,403

[22] Filed: Jul. 19, 1982

[30] Foreign Application Priority Data

Aug. 28, 1981 [DE] Fed. Rep. of Germany ....... 3133781

[51] Int. Cl.[4] ............................................. G01M 3/20
[52] U.S. Cl. ...................................... 73/40.7; 415/90
[58] Field of Search ...................... 73/4 V, 1 R, 40.7; 415/90

[56] References Cited

U.S. PATENT DOCUMENTS

| | | | |
|---|---|---|---|
| 3,616,680 | 11/1971 | Schrader | 73/40.7 |
| 3,690,151 | 9/1972 | Briggs | 73/40.7 |
| 4,057,369 | 11/1977 | Isenberg | 415/90 |
| 4,180,370 | 12/1979 | Klatt | 415/90 |
| 4,332,522 | 6/1982 | Saulgeot | 415/90 |

FOREIGN PATENT DOCUMENTS 2049117 5/1971 Fed. Rep. of Germany .
1648648 2/1972 Fed. Rep. of Germany .

Primary Examiner—Charles Frankfort
Assistant Examiner—Denis E. Corr
Attorney, Agent, or Firm—Felfe & Lynch

[57] ABSTRACT

A turbomolecular pump for counterflow leakage tests and the method of its use arranges two, tandem turbomolecular pump stages for pumping toward each other and connects opposite ends of the tandem pump stages respectively to a container or test tank through which a test gas is provided when there is a leak and a detector for detecting the test gas. A connection between the tandem pump stages connects to a forepump for assisting the turbomolecular pump. Arranging the turbomolecular pump in this way permits different pressures in the container or test tank and detector, as is often desired when, for example, the detector is a mass spectrometer, without partition and conduit arrangements therefor.

6 Claims, 1 Drawing Figure

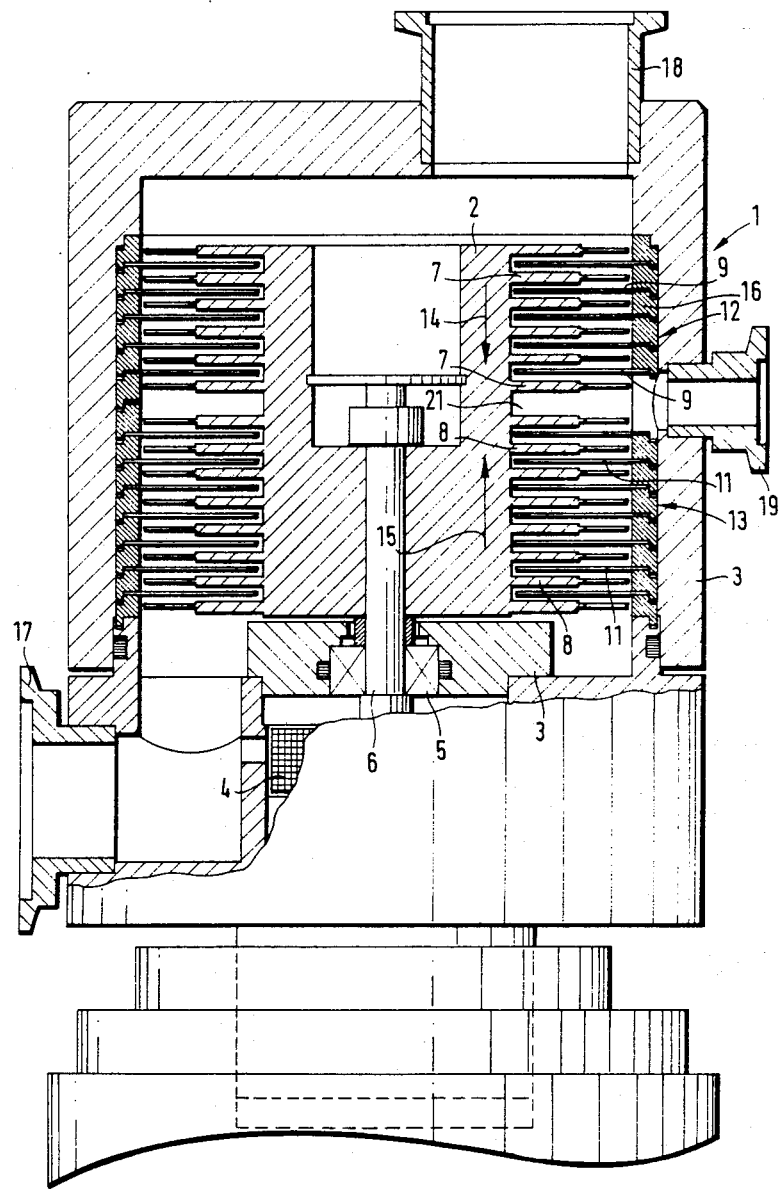

TURBOMOLECULAR PUMP SUITABLE FOR PERFORMING COUNTERFLOW LEAKAGE TESTS

BACKGROUND

Testing a container for leaks can be performed by evacuating the container being tested and spraying a test gas over it. Alternatively, if the container is small, it is also known to fill it with the test gas and place it in a test tank which is then evacuated. In either case, if the gas penetrates through the wall of the container, the container is leaky. A test gas detector connected to the vacuum line for evacuating the container or test tank thus makes it possible to determine whether such leakage is occurring. The test gas detector is often a mass spectrometer which is set for the test gas, preferably helium, and therefore for mass 4. Mass spectrometers, however, can be operated only at a pressure less than $1 \times 10^{-3}$ mbar and, preferably of $1 \times 10^{-4}$ mbar or less, while the pressure at which the leakage test can be performed is substantially greater. It is therefore known to pass test gas countercurrently through the high vacuum pump that evacuates the mass spectrometer (see, for example, Briggs U.S. Pat. No. 3,690,151, substantially corresponding to German No. 1,937,271).

In order to achieve high-capacity suction to the container being tested so as to reduce the pressure-adjustment time without reducing sensitivity, it is desirable to perform leakage tests at pressures which require the use of a high-vacuum pump also for the evacuation of the container being tested or the test tank, as the case may be. It is known from Becker U.S. Pat. No. 3,520,176 corresponding to German No. 1,648,648 and Schrader U.S. Pat. No. 3,616,680 corresponding to German No. 2,049,117 to use a turbomolecular pump having two, tandem pumping stages, one serving for the evacuation of the mass spectrometer and the other for the evacuation of the sample or the test vessel.

The container or test tank and the mass spectrometer, however, were both connected to the turbomolecular between the two tandem pump stages, while the forepump was connected to both outer ends of the two pump stages via a conduit system situated outside of the pump casing. This produced relatively great difficulties in separating the container or test tank connection from the mass spectrometer connection for the different pressures desired. In the Becker patent, a separate pump stage is required, with several rows of turbine buckets which are intended to form a gas-tight labyrinth packing. In the Schrader U.S. Pat. No. 3,616,680, the separation is said to be achieved by a "virtually gas-impermeable partition wall". The production of such a partition wall is technically complicated, because it is in the high vacuum and has to be sealed against a central shaft. Furthermore, in the previously known embodiments it is disadvantageous that the test gas that is to be registered has to travel a relatively long path, namely from the container or test tank connection through the stage serving for the evacuation of the test tank, through the forepump conduit system situated outside of the pump casing—partially in a counterflow—and finally in a counterflow through the pump stage serving for the evacuation of the mass spectrometer, all of which impairs the sensitivity of the leakage test.

THE INVENTION

It is the object of the present invention to simplify a turbomolecular pump arrangement for counterflow leakage tests.

This object is achieved in accordance with the invention by providing connections for a mass spectrometer and a container or test tank to be tested in the area of opposite outer end of a tandem-stage turbomolecular pump system such that the pumped gas flows, during operation, from the opposite, outside ends of the pump to the inside (e.g. middle) respectively through the two pump stages, and a common forepump connection between the two pump stages. In other words, the tandemly-arranged turbomolecular pump stages pump towards eachother. In a turbomolecular pump constructed in the manner and suitable for the performance of counterflow leakage tests, there is no longer any difficulty in separating the two pump-stage flows. The path to be traveled by the test gas is also optimally shortened. Lastly, only one forepump connection is necessary, so that the conduit system situated outside of the pump casing also can be eliminated.

Additional advantages and details of the invention will be explained with the aid an embodiment represented diagrammatically in the drawing. The drawing shows in cross section only the part of the turbomolecular pump that is important to the realization of the invention.

The turbomolecular pump 1 has a rotor 2, which is mounted at only one end, i.e., cantilevered, in the casing 3 and can be driven by means of the motor 4. All that is visible is a diagrammatically represented bearing 5 for the shaft 6 of the rotor. This bearing can be a rolling bearing or a magnetic bearing.

The rotor 2 bears rotor bucket disks 7 and 8 which with corresponding stator bucket disks 9 and 11 form two pump stages 12 and 13 whose pumping direction is indicated by the arrows 14 and 15 (from the outside in). The stator bucket disks 9 and 11 are mounted in the thereby-common casing 3 of the turbomolecular pump by means of spacer rings 16.

The casing 3 of the turbomolecular pump 1 has a total of three connections 17, 18 and 19. Connections 17 and 18 are situated adjacent the outer ends of the pump system formed by the two pump stages 12 and 13. Between the two pump systems is the common forepump connection 19. In the area of the forepump connection 19 one stator bucket plate is missing, so that a gap or common, open space 21 results which separates the two pump stages 12 and 13 from one another.

It is known that the pumping properties of a turbomolecular pump can be influenced especially by the angle of attack and the spacing of the buckets. Depending on which of the two connections 17 and 18 the container being tested or the mass spectrometer is attached to, the two pump stages 12 and 13 are to have different pumping properties. If the bearing 5 is in the form of a rolling bearing, it might be desirable to connect the container being tested to connection 17 and the mass spectrometer to the connection 18. It is then unnecessary to produce the especially low pressure necessary for the operation of the mass spectrometer in the area of the bearing, so that trouble does not occur due to lubricant vapors entering from the bearing chamber. These considerations, however, are invalid whenever axial seals which completely absorb lubricant vapors are used, or when a mass spectrometer is used which is not liable to such problems, or when the bearing 5 is in the form of a magnetic bearing. In both cases, then, even the single-bearing mounting of the rotor is unnecessary.

Since the pressure produced by the forepump connected to the connection 19 is equal to or less than 0.2 mbar, the pump stage 13 has the purpose of evacuating the test sample or test tank connected to connection 17, preferably down to a pressure of less than 0.1 mbar. Moreover, this pump stage is to be able to pump the test gas particularly well. The pump stage 13 must therefore have a very high ability to aspirate and to compress the test gas so that the leakage test can be performed rapidly and reliably.

With regard to pump stage 12, the requirement is that it must be able to evacuate the mass spectrometer connected to connection 18 down to a pressure of at least $10^{-4}$ mbar, and to let the test gas pass through it countercurrently with the least possible hindrance. Consequently, this pump stage 12 should have sufficient power for the evacuation of the mass spectrometer and a compression capacity that is low for the test gas.

For the fulfillment of the above described requirements demanded of the two pump stages 12 and 13, it has therefore proven to be especially advantageous for the pump stage serving for the evacuation of the article being tested or of the test tank to have more rows of buckets than the pump stage serving for the evacuation of the mass spectrometer and operated countercurrently for the test gas.

One special advantage of the present invention lies in the fact that the performance of the leakage test with the described turbomolecular pump under a great variety of circumstances is especially simple. For example, by varying the rotatory speed of the rotor of the turbomolecular pump it is possible to preset it for the pumping characteristics (aspirating capacity, compression capacity) desired in each case in the pump stages 12 and 13. Also the calibration of the sensitivity of the leak test apparatus operated with the turbomolecular pump can be performed by controlling the rotatory speed of the rotor 2. The calibration of the sensitivity can also be accomplished by making the effective aspirating capacity of the forepump adjustable at the connection 19. This can be done, for example, by measures taken at the forepump itself or by means of an adjustable throttle valve.

Thus too, it becomes possible to establish optimum parameters for various test gases. Therefore all light gases having a mass equal to or less than 20 can be used, such as for example $H_2$, $D_2$, HD, TH, TD, $T_2$, $He^3$, $He^4$, $CH_4$, Ne or the like.

I claim:

1. A turbomolecular pump for a counterflow gas-leakage testing arrangement having one of a container to be tested or a test tank with a container therein to be tested for a leakage-testing test gas, a test gas detector for detecting the test gas, and a forepump for assisting the turbomolecular pump, the turbomolecular pump comprising:

two, tandemly-arranged, turbomolecular pump stages (12,13) for pumping toward each other into a common, open space (21) directly therebetween;

a common pump casing (3) about the pump stages and the common, open space (4) directly therebetween;

means (6) for rotating the pump stages;

first and second connections (17,18) through the common pump casing at opposite ends of the pump stages for respective connection to the one of the container or test tank and to the test gas detector; and a connection (19) through the common pump casing to the common, open space between the pump stages for connection to the forepump.

2. Turbomolecular pump of claim 1, wherein the means for rotating the pump stages comprises a rotor (2) on a shaft (6) in magnetic bearings (5) on the casing (3).

3. Turbomolecular pump of claim 1 or 2, wherein the means for rotating the pump stages comprises means mounting both only at one end thereof and wherein the connection (17) to the container or test tank is at the bearing end.

4. Turbomolecular pump of claim 3, wherein the pump stage (13) at the connection to the container or test tank has a greater pumping capacity for the test gas than the other pump stage (12).

5. Turbomolecular pump of claim 1 wherein the test gas detector is a mass spectrometer.

6. A method of using a turbomolecular pump in a counter-flow gas-leakage testing arrangement having one of a container to be tested or a test tank with a container therein to be tested for a leakage-testing test gas, a test gas detector for detecting the test gas, and a forepump for assisting the turbomolecular pump, the method comprising:

providing two, tandemly-arranged, turbomolecular pump stages in a common pump casing for pumping toward each other into a common, open space in the pump casing directly between the pump stages;

connecting first and second connections through the pump casing to opposite ends of the pump stages respectively to the one of container or test tank and to the test gas detector; and connecting a connection through the common pump casing to the common, open space between the pump stages of the forepump.

* * * * *